(12) United States Patent
Foth et al.

(10) Patent No.: US 7,054,840 B1
(45) Date of Patent: May 30, 2006

(54) VIRTUAL BOOKSHELF FOR ONLINE STORAGE USE AND SALE OF MATERIAL

(75) Inventors: Thomas J. Foth, Trumbull, CT (US); Brian M. Romansky, Monroe, CT (US); Lee J. Royle, Scarsdale, NY (US)

(73) Assignee: Pitney Bowes Inc., Stamford, CT (US)

(*) Notice: Subject to any disclaimer, the term of this patent is extended or adjusted under 35 U.S.C. 154(b) by 838 days.

(21) Appl. No.: 09/704,864

(22) Filed: Nov. 2, 2000

(51) Int. Cl.
*G06F 17/60* (2006.01)

(52) U.S. Cl. .................... 705/57; 705/58; 705/59; 380/201; 380/202

(58) Field of Classification Search .............. 705/57, 705/58, 59; 380/200–202, 203; 713/200–202; 709/229; 707/202
See application file for complete search history.

(56) References Cited

U.S. PATENT DOCUMENTS

| | | | | |
|---|---|---|---|---|
| 4,654,799 A | 3/1987 | Ogaki et al. | ............... | 364/479 |
| 4,703,465 A | 10/1987 | Parker | ............... | 369/30 |
| 5,206,814 A | 4/1993 | Cahlander et al. | ......... | 364/479 |
| 5,220,657 A | 6/1993 | Bly et al. | ................... | 395/425 |
| 5,228,015 A | 7/1993 | Arbiter et al. | ............... | 369/33 |
| 5,237,157 A | 8/1993 | Kaplan | ................ | 235/375 |
| 5,418,763 A | 5/1995 | Ichikawa et al. | ............ | 369/30 |
| 5,633,839 A | 5/1997 | Alexander et al. | ........... | 369/30 |
| 5,638,443 A * | 6/1997 | Stefik | ........................ | 380/4 |
| 5,734,719 A | 3/1998 | Tsevdos et al. | ............... | 380/5 |
| 5,794,217 A | 8/1998 | Allen | ......................... | 705/27 |
| 5,848,398 A | 12/1998 | Martin et al. | ............... | 705/14 |
| 6,006,332 A | 12/1999 | Rabne et al. | ............... | 713/201 |
| 6,112,181 A | 8/2000 | Shear et al. | ................ | 705/1 |
| 6,135,646 A | 10/2000 | Kahn et al. | ............ | 395/200.47 |
| 6,138,119 A | 10/2000 | Hall et al. | .................... | 707/9 |
| 6,226,651 B1 * | 5/2001 | Masuda et al. | ............ | 707/202 |
| 6,289,452 B1 | 9/2001 | Arnold et al. | .............. | 713/175 |
| 6,292,711 B1 | 9/2001 | LaDue | ...................... | 700/241 |
| 6,295,482 B1 | 9/2001 | Tognazzini | ................ | 700/233 |
| 6,330,490 B1 | 12/2001 | Kim et al. | .................. | 700/234 |
| 6,449,367 B1 * | 9/2002 | Van Wie et al. | ............ | 380/232 |
| 6,618,484 B1 * | 9/2003 | Van Wie et al. | ............ | 380/232 |
| 6,948,070 B1 * | 9/2005 | Ginter et al. | ............... | 713/193 |
| 2004/0107166 A1 * | 6/2004 | Stefik et al. | ................. | 705/51 |

FOREIGN PATENT DOCUMENTS

JP 2004080751 A * 3/2004

* cited by examiner

*Primary Examiner*—Elisca Pierre Eddy
(74) *Attorney, Agent, or Firm*—Ronald Reichman; Angelo N. Chaclas

(57) ABSTRACT

A "virtual bookshelf" for users of a digital rights management system. The invention lists the purchased material and/or material that the consumer has a right to use. The invention automatically backs up the consumer's material when it is downloaded; provides for the retrieval and/or synchronization of the material on a computer or other device; provides for the rights-based sharing of the material; and the ability to recommend or transfer the material to a third party with or without financial consideration.

18 Claims, 7 Drawing Sheets

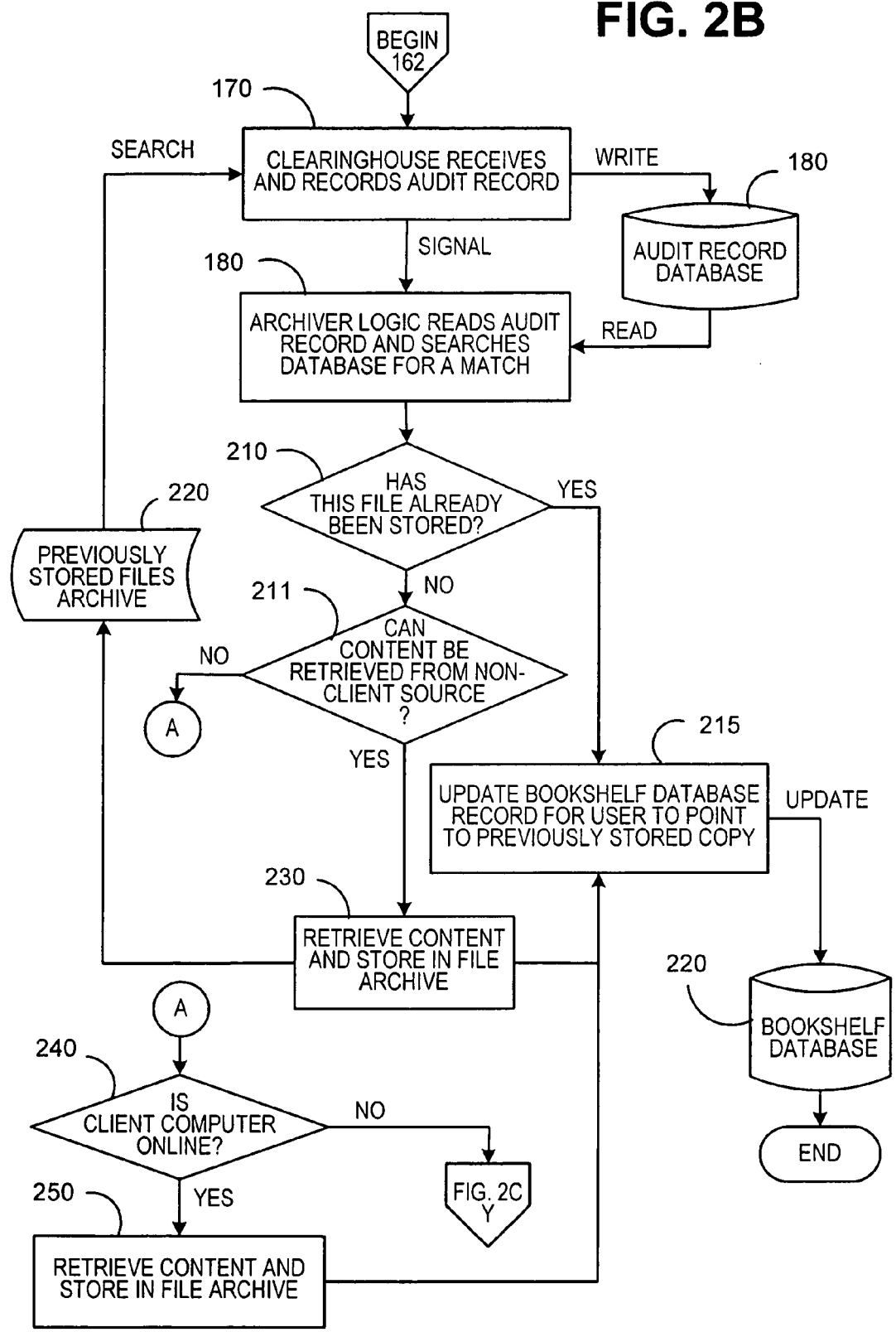

FIG. 3

| | TITLE 29 | DATE / AUTHOR 31 | TYPE 32 | RIGHTS 33 |
|---|---|---|---|---|
| SOFT WARE | ALGORITHMICS | HARDEL | BOOK | OWN |
| | CHAOS | GLICK | BOOK | BORROWED FROM JIM JONES |
| | DEBT OF HONOR | CLANCEY | BOOK | LOANED TO FRANK SMITH |
| ARTICLES | DRAGON NATURALLY SPEAKING | MAY 6, 1999 | SOFTWARE | OWN |
| | GRAND CANYON | SMITH | PHOTOGRAPH | OWN |
| BOOKS | TRUMAN | McCULLOUGH | | OWN |
| | TWO FOR TEA - SMITHSONIAN | MARCH, 2000 | ARTICLE | MAY MAKE 6 COPIES |
| | VISIO | MAY 10, 1998 | SOFTWARE | OWN |
| VIDEO | BIG LIE, SMALL WORLD | MAY 5, 2000 | MUSIC | PAY PER VIEW |
| | BLES MAN | DECEMBER 1, 1999 | MUSIC | PAY PER VIEW |
| | BLUES WE LIKE | APRIL 28, 1999 | MUSIC | OWN |
| MUSIC | DO RE ME | APRIL 28, 1999 | MUSIC | OWN |
| | ERIN BROKOVICH | JANUARY 5, 1999 | VIDEO | SOLD |
| | THE GODSON | FEBRUARY 5, 1998 | VIDEO | OWN |
| ALL | THE SOUND OF MUSIC | AUGUST 5, 2000 | VIDEO | OWN |

30

34 — OPTIONS

44 — SEARCH

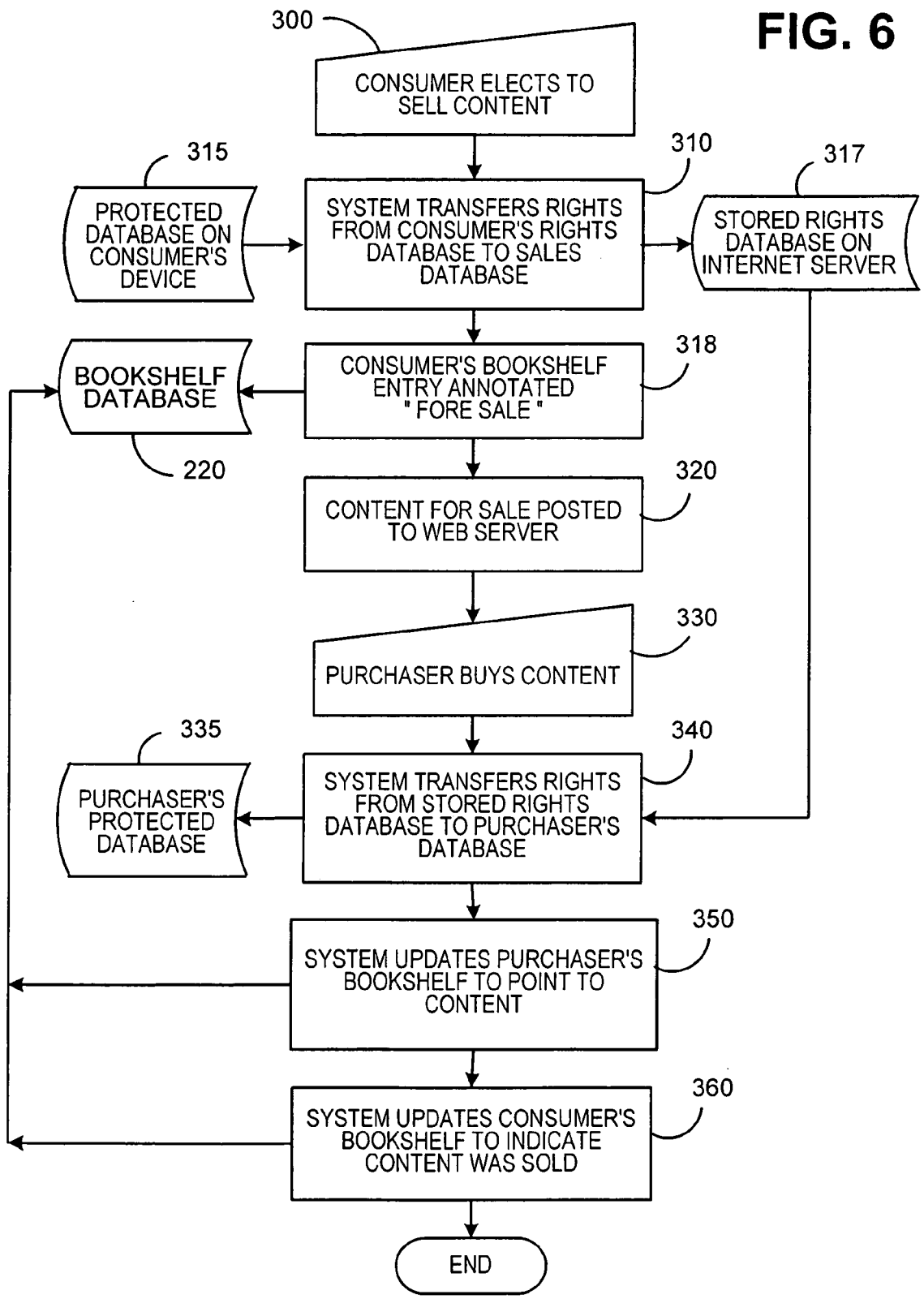

VIRTUAL BOOKSHELF FOR ONLINE STORAGE USE AND SALE OF MATERIAL

FIELD OF THE INVENTION

This invention pertains to the storage, use and sale of material and more particularly to the online storage, use and sale of material.

BACKGROUND OF THE INVENTION

In the past, literary and dramatic, musical, motion picture and photographic works were fixed in tangible forms commonly known as books. Musical works were recorded on records, tapes or compact disks, and motion pictures were recorded on film, tape or disk. Photographs were printed on paper, which may have been bound into books. The literary works, dramatic works, musical works, motion pictures, and photographs were tangible items that could be seen with the naked human eye and stored in book shelves. When the possessor of any one of the above items wanted to use one of the items, the possessor would go to the book shelf and retrieve the item.

In today's society, with the proliferation of personal computers and the ability to easily connect to the internet, people have the ability to download literary works, dramatic works, musical works, motion pictures, and photographs from an internet site to their computer. In some instances, the consumer owns one copy of the downloaded material and in other instances, the consumer may only have certain specified rights to use the downloaded material, i.e., for their own use, to use the downloaded material a specified number of times, etc.

A consumer usually had the right to make archival copies of the downloaded material. However, a consumer usually was unable or unwilling to make archival copies, since the copies usually required a large amount of backup memory space and/or were a hassle to make. If archival copies of the downloaded material were not made and the consumer's computer files were corrupted or the consumer's computer crashed, the consumer may not have been able to retrieve the downloaded material, because the provider web site of the downloaded material was no longer available, or the content comprising the downloaded material was no longer available.

Digital Rights Management (DRM) systems have been developed to control a user's accesses to the items stored in the system. Current DRM systems do not archive downloaded material purchased by the consumer.

SUMMARY OF THE INVENTION

This invention overcomes the disadvantages of the prior art by providing a "virtual bookshelf" for users of a DRM system. The present invention lists the purchased material and/or material that the consumer has a right to use. The invention automatically backs up the consumer's material when it is downloaded; provides for the retrieval and/or synchronization of the material on a computer or other device; provides for the rights-based sharing of the material; and the ability to recommend or transfer the material to a third party with or without financial consideration. The automatic archiving of material is advantageous over conventional media inasmuch as the archival copy is always available, i.e., VHS tapes may break rendering the tape useless and destroying what is on the tape.

A consumer is able to create a 'virtual bookshelf' of the purchased material and/or material that the consumer has a right to use that parallels bookshelves in the real world.

BRIEF DESCRIPTION OF THE DRAWINGS

FIGS. 2A–2C is a flow chart showing the automatic backup of material when the material is loaded or downloaded into a computer;

FIG. 3 is a chart listing the titles 29 contained in virtual bookshelf 30 for computer 11 or computer 16;

FIG. 6 is a flow chart describing the transfer of material.

DETAILED DESCRIPTION OF THE PREFERRED EMBODIMENT

Figure 1:
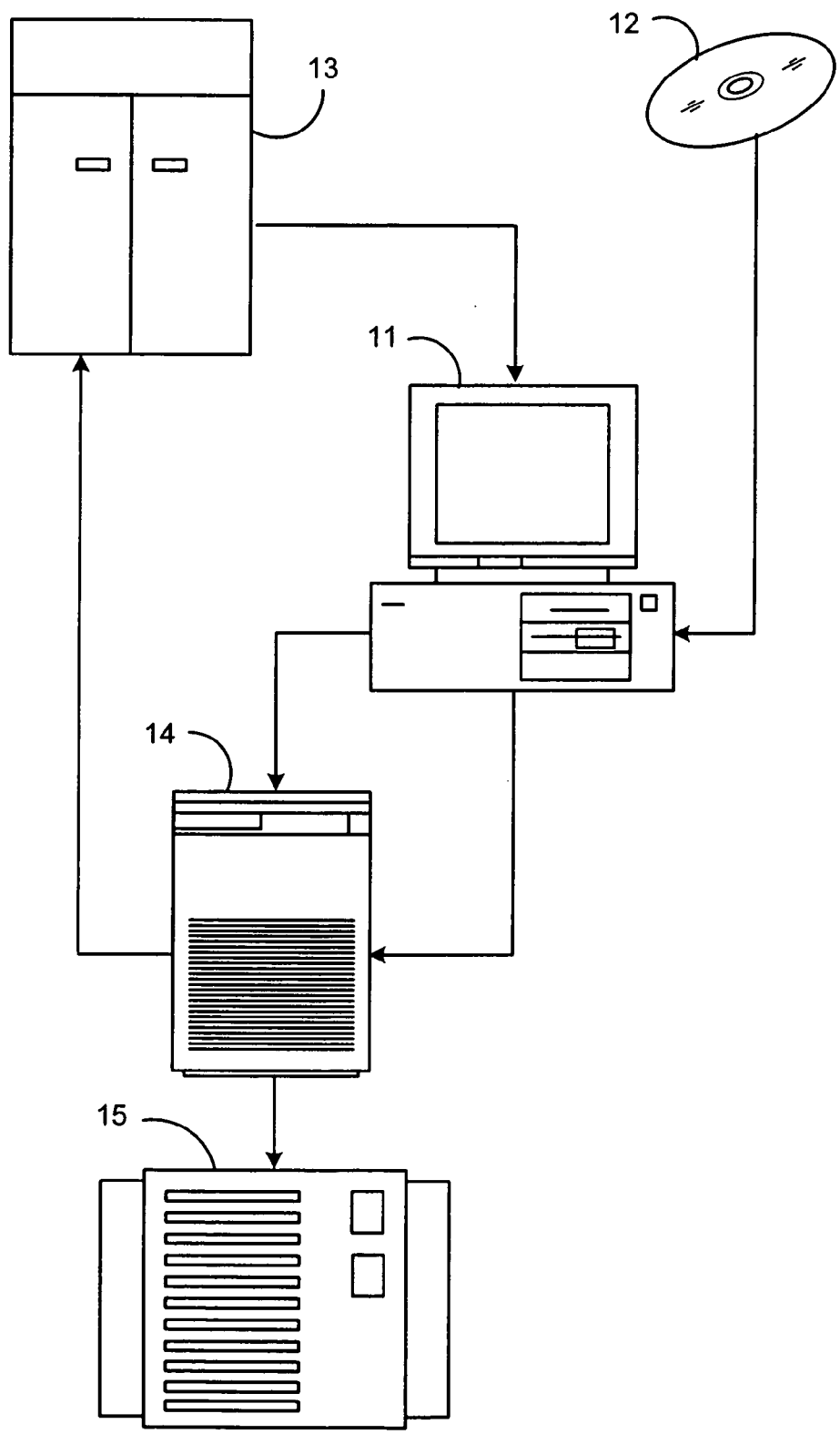
FIG. 1 is a drawing of a consumer computer acquiring rights to material.

Referring now to the drawings in detail, and more particularly to FIG. 1, the reference character 11 represents a consumer's computer. Computer 11 may obtain material by loading disk 12 in computer 11 and/or by downloading material from web site 13. The act of loading disk 12 and/or downloading material from web site 13 will cause an audit record to be entered into clearinghouse server 14. The record produced by server 14 will be more fully described in the description of FIG. 5. If the material downloaded from web site 13 is not already stored in archive 15 of server 14, server 14 attempts to retrieve the downloaded material from web site 13. If server 14 is unable to obtain the down loaded material from web site 13, server 14 will attempt to obtain the material from consumer computer 11. Server 14 will store the material in archive 15.

Figure 2A:
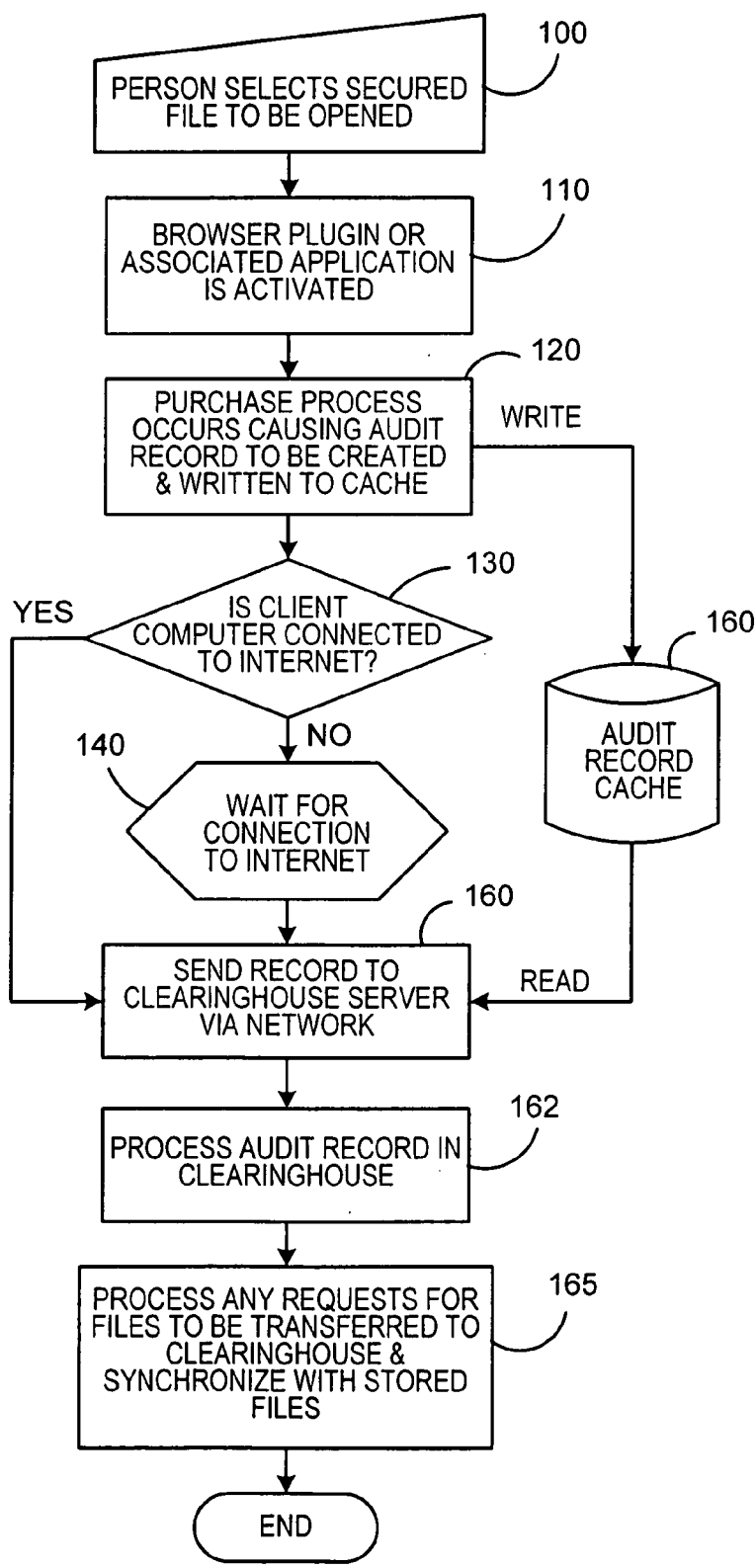
Figure 2C:
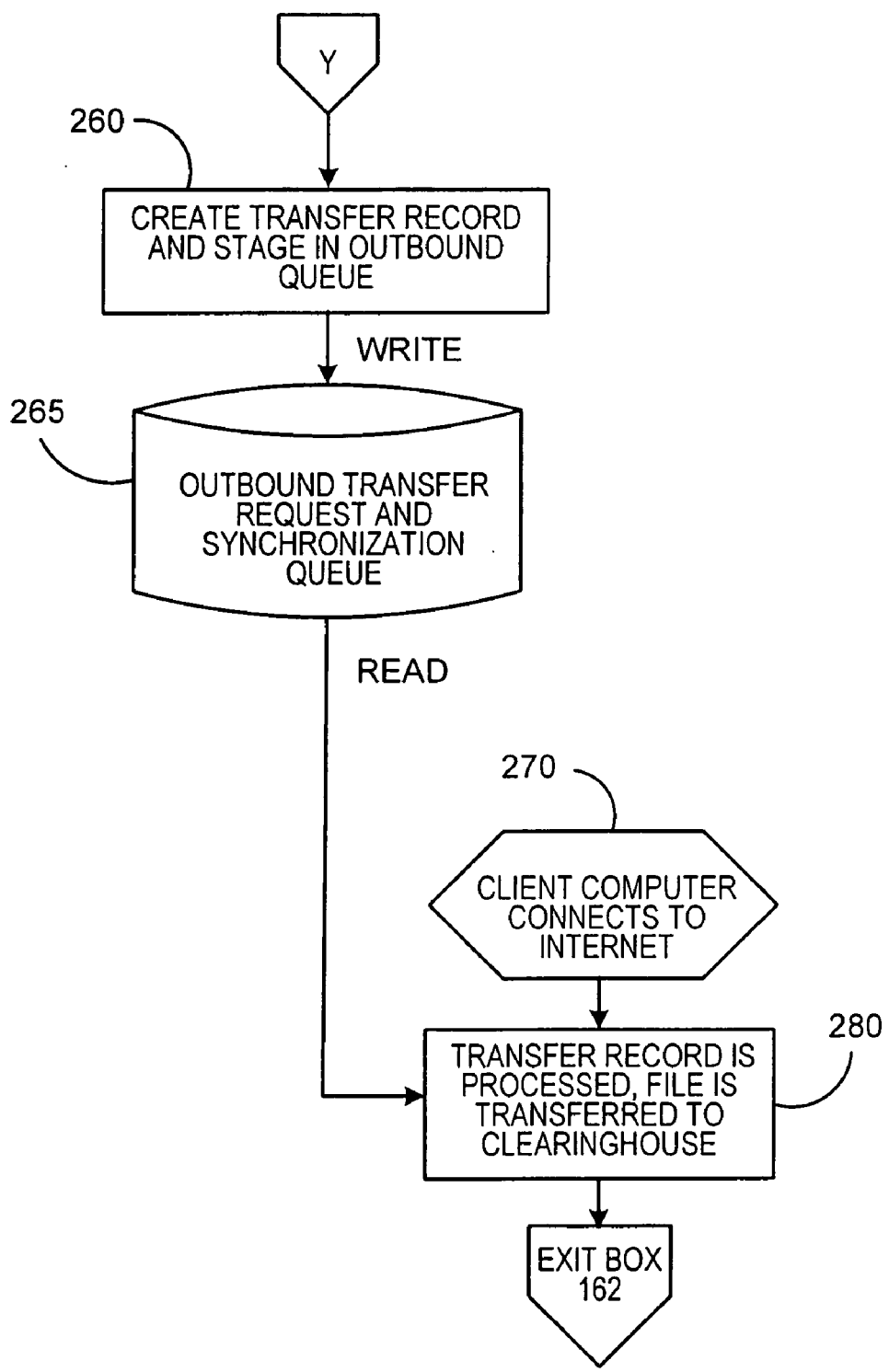

FIGS. 2A–2C is a flow chart showing the automatic backup of material when the material is loaded or downloaded into computer 11. The consumer selects a secure file to be opened in step 100. The secure file may be delivered to computer 11 via any media, i.e., networks, diskettes, CDs, memory devices, etc. Upon opening the secured file in step 110, previously installed software in computer 11, in the form of a browser plug in or other associated application is activated by the opening application, i.e., a browser, the operating system, or any other application including media rendering programs. In step 120, digital rights management software conducts the purchase process which grants the user the rights to render the material and an audit record that indicates the above transaction to be created and written to cache in step 160. The digital rights management software may be obtained from Intertrust Technologies Corporation of 4750 Patrick Henry Drive, Santa Clara, Calif. 9504.

The DRM software in step 130 determines whether or not computer 11 is connected to the internet. If consumer computer 11 is not connected to the internet at the time of purchase, i.e., purchasing material from a CD offline, the digital management software will wait until a connection to the internet is achieved in step 140. Once computer 11 is linked to the internet, the audit record or is transmitted to clearinghouse server 14 in step 160. In step 162 server 14 will process the audit record. In step 165 server 14 processes any requests for material stored on computer 11 to be transferred to sever 14 and synchronized with the stored files in archive 15. After the processing is complete the program ends.

FIG. 2B describes the process performed by server 14 in block 162 (FIG. 5A). In step 170, clearinghouse server 14 receives and records the audit record. In step 180 the audit record is written in a database. In step 190, the reception of the audit record causes server 14 to activate an asynchronous computer routine that reads the record and searches the database of previously stored material to find a match. Step 210 determines whether or not the material has already been stored in archive 15, i.e. another consumer has purchased the material and the material has previously been stored in server 14, etc. Material which has been previously stored in archive 15 or the material which has been preloaded by a content provider in anticipation of future purchases is retained in the form secured by the DRM system. If the material has been previously stored in server 14, the next step will be step 215. Step 215 will update the virtual bookshelf 30 database record for computer 11 to point to the previously stored copy of the material. The virtual bookshelf 30 database will then be updated in step 220. The program will end at this point. If step 210 determines that the material has not been previously stored in server 14, the next step will be step 211.

Step 211 determines whether or not the material may be retrieved from a provider of material, which could be content provider web site 13. If step 211 determines that the material may not be retrieved from a provider of material, the next step will be step 240. Step 240 will determine whether or not computer 11 is online. If step 240 determines that computer 11 is online, the next step will be step 250. Step 250 will retrieve the material from computer 11 and store the material in archive 15 (FIG. 1). The next step will be step 215, where the virtual bookshelf 30 database will be updated. If step 240 determines that computer 11 is not online, the next step will be step 260 (FIG. 2C). Step 260 will create a transfer record and stage in outbound queue on server 14. The next step may be step 270, where computer 11 is connected to the internet. In step 280, the transfer record is processed, and the material is transferred from computer 11 to archive 15. At this point, step 162 will be exited.

If step 211 determines that the material may be retrieved from a material provider, the next step will be step 230. Step 230 will retrieve the material and store the material in archive 15 (FIG. 1). The virtual bookshelf 30 database will then be updated in step 215. Server 14 may make available the material stored in archive 15 by displaying an index of the material in virtual bookshelf 30.

FIG. 3 is a chart listing the titles 29 contained in virtual bookshelf 30 for computer 11. The date and/or author of the title is listed in column 31, and the type of the material, i.e., music, video, book, article, software, photograph, etc. is listed in column 32. Column 33 indicates the rights that the owner of computer 11 has to the material. For instance, the owner of computer 11 may own the material; have the right to make a specified number of copies of the material; have to pay for each viewing of the material; have borrowed the material from someone or something; or may have loaned the material to someone or something. The user of computer 11 may view the entire contents of virtual bookshelf 30 on the display of computer 11 or view specific categories of virtual bookshelf 30, i.e., music, videos, books, articles, software, photographs, etc at a particular time.

Virtual bookshelf 30 represents all material to which the owner of computer 11 has rights, regardless of where the material is stored.

Figure 4:
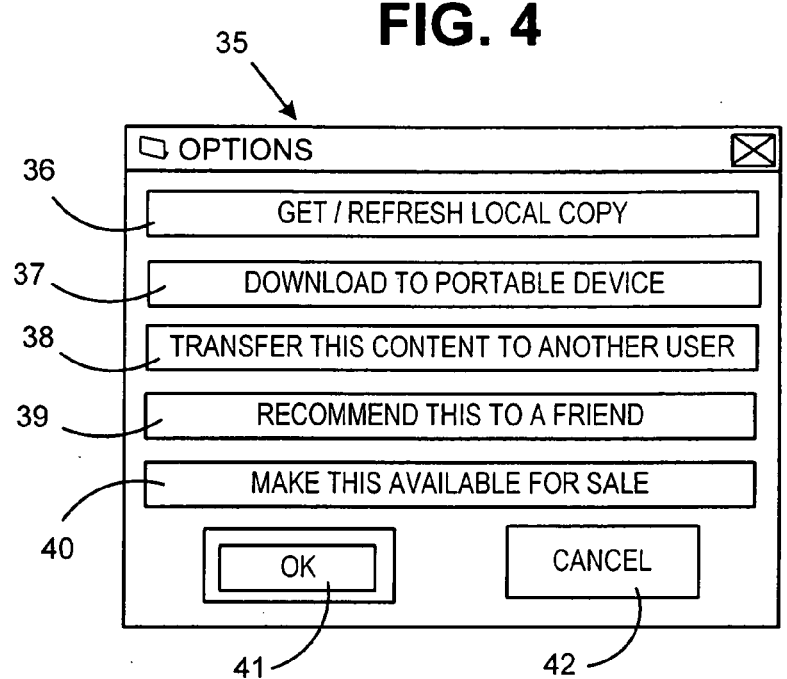
FIG. 4 is a menu listing options that the operator of computers 11 and/or 16 have to the material.

A user of computer 11 may click on search 44, which will cause a dialogue box (not shown) to be displayed allowing the user to specify the search criteria. After the search criteria has been specified, search 44 will search the list of owned material in bookshelf 30 and, when found, a description of the material will be appropriately rendered (displayed or played) or retrieved from the archive and rendered A user of computer 11 may click on options 34 and view display menu 35 (FIG. 4). By highlighting the selected material in virtual bookshelf 30 and clicking on spaces 36 and 41, the user of computer 11 may obtain or refresh a local copy of the highlighted material. By highlighting the selected material in virtual bookshelf 30 and clicking on spaces 37 and 41, the user of computer 11 may download a local copy of the highlighted material to a portable device. By highlighting the selected material in virtual bookshelf 30 and clicking on spaces 38 and 41, the user of computer 11 may transfer the highlighted material to a third party. By highlighting the selected material in virtual bookshelf 30 and clicking on spaces 39 and 41, the user of computer 11 may recommend the highlighted material to a friend. When the material is recommended by the owner of computer 11 to another computer in the system, i.e., the owner of computer 16, the owner of computer 11 retains all rights to the material. The owner of computer 16 must secure rights to the material in order to use the material. By highlighting the selected material in virtual bookshelf 30 and clicking on spaces 38 and 41 the user of computer 11 may make the highlighted material available to a friend and relinquish their rights to the material. When space 42 is clicked the previous command is cancelled. By highlighting the selected material in virtual bookshelf 30 and clicking on spaces 40 and 41 the owner of computer 11 relinquishes rights to the material and transfers the ownership of all rights to the material to the purchaser of the material, i.e., the owner of computer 16.

Figure 5:
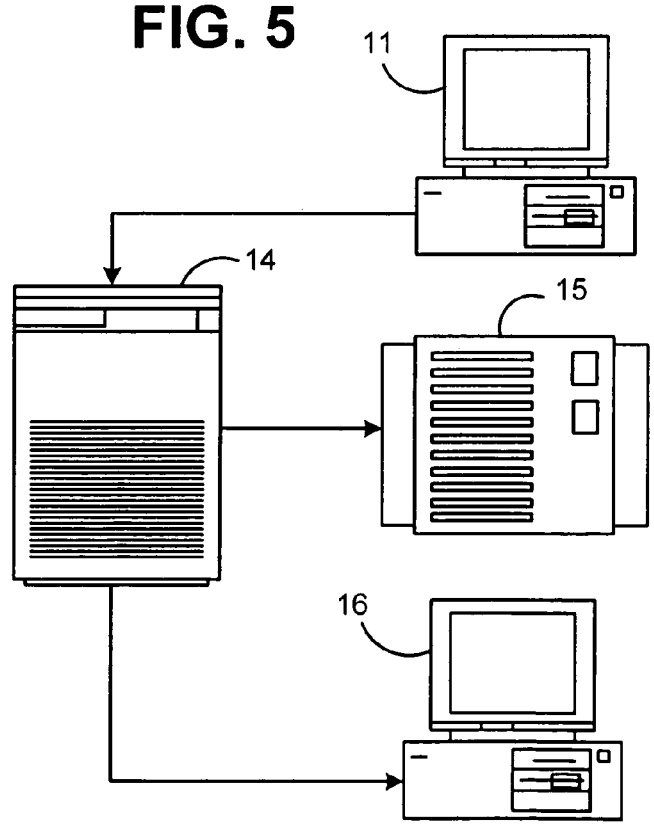
FIG. 5 is a drawing of consumer computer 11 transferring rights to material to transferring consumer computer 16.

FIG. 5 is a drawing of consumer computer 11 transferring rights to material to transferring consumer computer 16. When the owner of computer 11 decides to transfer the rights he/she has to selected material, the rights to the selected material that the owner wants to transfer are transferred from computer 11 to clearinghouse server 14. Server 14 will hold the rights in escrow and post the selected material for sale, gift, loan or transfer. When the owner of transferring consumer computer 16 discovers and selects the material selected for sale or transfer on server 14, funds if needed are transferred from the transferring consumer account of computer 16 to the consumer account of computer 11. Consumer accounts 16 are stored in server 14. The rights to access the material are transferred from server 14 to computer 16. The virtual bookshelf 30 entry for computer 11 (FIG. 5) is updated to mark the transaction, i.e., sold, gift, loaned, etc. The virtual bookshelf 30 entry for computer 16 is also updated to mark the above transaction. Computer 16 downloads the transferred material from archive 15. Computer 11 or computer 16 may be a personal computer, personal data assistant, digital music player, cellular telephone or any device that may render digital material.

FIG. 6 is a flow chart describing the transfer of material. In step 300, consumer computer 11 elects to sell or transfer material. In step 310, the rights that computer 11 has to the material are transferred from consumer computer 11 current rights data base 315 which is located in computer 11 to the stored rights data base 317 which is located in server 14. In step 318, the consumer computer 11 virtual bookshelf 30 entry is annotated "for sale" or "for transfer". The aforementioned annotation is entered in the virtual bookshelf 30 database in step 220. In step 320, the material indicated for sale and/or transfer is posted to a web server. Then in step 330, a purchaser or recipient, i.e., the owner of computer 16 buys or is given the rights that consumer computer 11 is willing to transfer to the material.

At the conclusion of step 330 the next step will be step 340. In step 340, the rights to the material that consumer computer 11 is going to transfer will be transferred from the stored rights database 317 on server 14 to the consumer protected data base 335 on computer 16. In step 350 transferring consumer computer 16 virtual bookshelf 30 in data base 220 will be updated to point to the material hereinbefore transferred. In step 360 the consumer computer 11 virtual bookshelf 30 in data base 220 will be updated to indicate that the above material was transferred. At this point the program ends.

The material transferred from computer 11 to computer 16 may be all of the rights to the material that the owner of computer 11 has or a portion of the rights that the owner of computer 11 has to the material. For instance, the owner of computer 11 may grant the user of computer 16 the right to use the material a specified number of times, according to the rights that the owner of computer 11 has to the material or to use the material for a specified time period.

The above specification describes a new and improved virtual bookshelf for users of a digital rights management system. It is realized that the above description may indicate to those skilled in the art additional ways in which the principles of this invention may be used without departing from the spirit. Therefore, it is intended that this invention be limited only by the scope of the appended claims.

What is claimed is:

1. A method for handling material, the method comprising the steps of:
    a) obtaining digital rights management protected material for a consumer;
    b) informing a bookshelf that the protected material was obtained;
    c) determining whether or not there is an existing copy of the protected material;
    d) storing an existing copy of the protected material from a plurality of sources of the protected material automatically for archival purposes at a site remote from the consumer at the time the material was first obtained by the consumer; and
    e) creating a pointer for the consumer to point to the stored archival material.

2. The method claimed in claim 1, wherein the existing copy of the protected material is obtained from the provider of the material.

3. The method claimed in claim 1, wherein the existing copy of the protected material is obtained from the vendor of the material.

4. The method claimed in claim 1, wherein the existing copy of the protected material is obtained from the consumer of the material.

5. The method claimed in claim 1, wherein the pointer is located in a bookshelf.

6. The method claimed in claim 1, further including the step of:
    transferring the consumer's rights to the material to a third party.

7. The method claimed in claim 6, further including the step of:
    archiving automatically the transferred material for the third party at a site remote from the third party.

8. The method claimed in claim 7, further including the step of;
    creating a pointer for the consumer to point to the transferred archival material.

9. The method claimed in claim 8, further including the step of:
    creating a pointer for the third party to point to the transferred archival material.

10. The method claimed in claim 1, further including the step of: transferring a portion of the consumer's rights to the material to a third party.

11. The method claimed in claim 10, further including the step of transferring the consumer's rights to the material to a third party.

12. The method claimed In claim 11, further including step of:
    archiving automatically the transferred material for the third party at a site remote from the third party.

13. The method claimed in claim 11, further including the step of:
    creating a pointer for the consumer to point to the transferred archival material.

14. The method claimed in claim 1, further including the step of: retrieving a copy of the protected material.

15. The method claimed in claim 1, further including the step of: loaning the material to a third party.

16. The method claimed in claim 15, further including the step of:
    archiving automatically the loaned material for the third party at a site remote from the third party.

17. The method claimed In claim 16, further including the step of:
    creating a pointer for the consumer to point to the loaned archival material.

18. The method claimed in claim 16, further including the step of:
    creating a pointer for the party to point to the loaned archival material.

* * * * *